United States Patent Office 3,153,671
Patented Oct. 20, 1964

3,153,671
PREPARATION OF AMINE, PHOSPHORUS
AND ARSENIC BORANES
Eugene C. Ashby, Baton Rouge, La., assignor to Ethyl
Corporation, New York, N.Y., a corporation of
Virginia
No Drawing. Filed Aug. 7, 1959, Ser. No. 832,146
6 Claims. (Cl. 260—583)

This invention relates to and has as its chief objective the provision of a chemical process for the preparation of hydrides of boron.

According to this invention, there is provided a process for the preparation of hydrides of boron characterized by the step of reacting (1) a fully esterified aryl ester of an oxyacid of boron in which (a) the boron is bonded solely to oxygen atoms and (b) all of the esterifying groups are aryl groups, with (2) a metal borohydride in which the metal is a light metal of atomic number 3 through 56, the reaction being conducted in admixture with a hydrocarbyl compound of a Group VA element of atomic number 7 through 33, said compound being further characterized in that it contains three monovalent radicals directly affixed to the Group VA element, from 1 to 3 of said radicals being hydrocarbyl radicals with the balance, if any, being hydrogen. As a result of this novel and highly important process high yields of boron hydrides are achieved.

The above described aryl esters of oxyacids of boron comprise a well recognized group of aryl borates. Thus, one type is the aryl orthoborates having the formula $$(RO)_3B$$

where R is an aryl group. Another type is the aryl metaborates (also known as aryloxy boroxines) of the formula

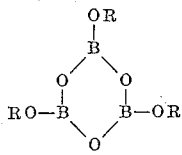

R again being an aryl group. Another type is composed of the aryl pyroborates. These have the formula

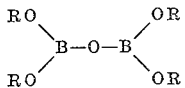

where R is an aryl radical. In the foregoing formulas the aryl groups preferably contain no more than about 18 carbon atoms each. They can be the same or different aryl groups.

Typical examples of the above borate esters include triphenyl orthoborate, triphenyl metaborate, tetraphenyl pyroborate, the tritolyl ortho and metaborates, the tetraxylyl pyroborates, tri α-naphthyl orthoborate, cumenyl diphenyl orthoborate, tri-(p-dodecylpheyl)metaborate, and the like.

The above defined borohydride reactant contains a light metal of atomic number 3 through 56. It is well recognized in the art, as exemplified by the Periodic Chart of the Elements as reprinted in Lange's Handbook of Chemistry, Handbook Publishers, Inc., Sandusky, Ohio, 1946 (6th edition), pp. 58–59, that these light metals are composed solely of the metals of Groups IA and IIA of the Periodic Table. Hence, these light metals consist of lithium, sodium, potassium, rubidium, cesium, beryllium, magnesium, calcium, strontium and barium. Therefore, typical examples of the borohydride reactant include lithium borohydride, sodium borohydride, potassium borohydride, magnesium borohydride, calcium borohydride, and the like. Of these compounds the alkali metal borohydrides, especially lithium borohydride and potassium borohydride, and most especially sodium borohydride, are preferred because of the very substantial cost-effectiveness benefits they exhibit in the practice of this invention.

The hydrocarbyl compound as defined above can be represented by the formula

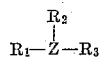

where Z is nitrogen, phosphorus or arsenic; $R_1$ is a hydrocarbyl group; and $R_2$ and $R_3$ are hydrocarbyl groups or hydrogen atoms. Each such hydrocarbyl group can contain up to about 36 carbon atoms. In other words, these hydrocarbyl compounds are primary, secondary or tertiary amines, phosphines and arsines. The hydrocarbyl radicals of these compounds can be alkyl, cycloalkyl, aralkyl, alkenyl, aryl, alkary, and reated univalent hydrocarbon groups. Generaly speaking, the stronger the basicity of the hydrocarbyl compounds the better are the yield of desired product and the rate of reaction. Accordingly, it is desirable to use compounds having an ionization constant characteristic of a base of at least $10^{-12}$ as measured in aqueous solution at 25° C. A preferred embodiment of this invention involves the use of primary, secondary and tertiary alkyl amines; secondary and tertiary alkyl phosphines; and secondary and tertiary alkyl arsines, especially those compounds in which each alkyl group contains from 1 to about 8 carbon atoms. Triethyl amine, dipropyl amine, butyl amine, methyl ethyl amine, triethyl phosphine, trihexyl arsine, dioctyl phosphine, diisoamyl arsine, and the like, serve as examples of these preferred compounds.

From the viewpoints of cost and desirability of end products the use of amines as the hydrocarbyl compound is preferred.

The temperature at which the process of this invention takes place varies somewhat depending upon the nature of the materials used. In general, however, the reaction is conducted by heating the reactants to a temperature to which reaction takes place but below the temperature to which decomposition of starting materials or end products occurs. In most cases this temperature ranges from above about 100° C. to below about 250° C. Very good reaction rates are achieved at temperatures within the range of 140° to 200° C. Accordingly, this constitutes another preferred embodiment of this invention. When using amines as the hydrocarbyl component temperatures ranging from about 180° to about 200° C. are especially desirable and preferred.

The present process can be conducted at atmospheric pressure when the several components are not vaporized under the temperatures used. However, under most instances it is desirable to conduct the reaction in a closed system (such as in an autoclave) and, therefore, take advantage of autogenous pressure. Under these circumstances a positive pressure can be initially imposed upon the system if desired. For example, the reaction vessel can be charged with an inert gas blanket (nitrogen, argon, neon, krypton, etc.) to a pressure of as high as about 5,000 p.s.i.g. and then the reaction caused to take place. These latter techniques are advantageous when using the more volatile starting materials.

If desired, a trace amount of a Friedel-Crafts catalyst can be used in the process of this invention to assist reaction start-up and improve reaction rate. Use of such catalyst is not necessary, however. Examples of such catalysts are aluminum chloride, zinc chloride, ferric chloride, titanium tetrachloride, zirconium tetrachloride, the corresponding bromides, and the like.

In conducting the process of this invention, good results are achieved when using from about 0.5 to about 5 moles of the borate per mole of the borohydride. While departures from this ratio can be effected, there is no particular advantage in doing so. The other component— viz. the above defined hydrocarbyl compound—should be present in amount such that there is at least 1 mole thereof per mole of the borate. Thus up to about 20 moles of the hydrocarbyl compound per mole of the borate can be successfully used and in such case the excess acts as a convenient reaction solvent. On the other hand, when the ratio is from 1 to about 2 moles of the hydrocarbyl compound per mole of the borate, use can be made of an inert solvent. Suitable solvents are hydrocarbons and ethers, especially those which are liquid under the temperature and pressure conditions employed.

An outstanding feature of this invention is the fact that a wide variety of desirable end products—i.e. hydrides of boron—can be formed depending upon the particular hydrocarbyl compound used. Thus when amines are used, the resultant product is a hydride of boron which contains nitrogen in the molecule. By the same token, when phosphines or arsines are used the resultant hydrides of boron contain phosphorus or arsenic respectively.

The type of amine, phosphine or arsine used likewise exerts a profound influence upon the type of end product formed. For example, when tertiary amines are used the product is tertiary amine borane—i.e. a hydride of boron having the formula $$BH_3NR_1R_2R_3$$

where $R_1$, $R_2$ and $R_3$ are as defined above. When a secondary amine is used, the product is an N,N-dihydrocarbyl borazene of the formula

$$BH_2NR_1R_2$$

in which $R_1$ and $R_2$ are as defined above. When primary amines are used the resultant product is an N,N',N''-trihydrocarbyl borazole of the formula

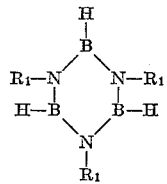

where $R_1$ is as defined above.

The same type of products are formed when primary, secondary and tertiary phosphines and arsines are used except that, of course, the nitrogen atoms shown in the preceding 3 formulas are replaced with phosphorus or arsenic atoms. It is seen, therefore, that the present process provides the art with a highly efficient method for the preparation of a wide variety of important chemical products.

Another striking feature of this invention is the fact that in the absence of the above defined hydrocarbyl compound, the corresponding reaction does not occur between, for example, sodium borohydride and triphenyl borate. As a matter of fact, no reaction whatsoever occurs. Hence a key feature in the present process is the driving force provided by the above hydrocarbyl component.

This invention can be further understood by reference to the following specific examples in which all parts and percentages are by weight unless otherwise specified.

*Example I*

The reaction equipment is composed of a closed reaction vessel equipped with reagent-introducing means and temperature regulating means. Place 100 parts (by volume) of triethylamine and 28 parts of triphenyl orthoborate into the reaction vessel. Then add thereto 2.8 parts of sodium borohydride. Heat the resultant system for 15 hours at 200° C. Cool the reaction mixture to room temperature and filter the same whereby a flocculent white solid is obtained. Dissolve this solid in 200 parts (by volume) of tetrahydrofuran and filter. Add 100 parts (by volume) of n-hexane to the filtered tetrahydrofuran solution, and cool the resultant solution to −60° C. A white crystalline solid precipitates. Recover this white solid from the mother liquor by cold filtration and then dry the solid in a vacuum drying oven for several hours. The dry product when subjected to infra-red chemical analysis is found to be sodium tetraphenoxyborate. Subject the original filtrate to vacuum distillation. The triethylamine is removed first and then triethylamine-borane distills over at 97° C. at 10 mm. The infra-red spectrum of this compound is identical to the spectrum obtained from triethylamine-borane produced by the reaction of diborane with triethylamine.

*Example II*

Sodium borohydride (3.5 parts) was reacted with phenyl borate (34.5 parts) in 100 parts (by volume) of dimethyl aniline at 180° C. for 14 hours. A trace of aluminum chloride was used as a catalyst. The reaction mixture was filtered and the filtrate diluted with dimethyl aniline to 250 parts (by volume). Infra-red analysis indicated a significant yield of dimethylaniline-borane.

*Example III*

Into the reaction vessel described in Example I are placed 28.8 parts of triphenyl metaborate, 14.8 parts of tributylamine, and 125 parts of petroleum ether. A white solid adduct is formed between the metaborate and the amine. Then, 1.32 parts of lithium borohydride is added to the system. The resultant mixture is heated to 180° C. for 10 hours resulting in the formation of tributyl amine borane in good yield.

*Example IV*

Placed in the reaction equipment described in Example I are 1.62 parts of potassium borohydride, 9.32 parts of tetra-(o-tolyl)pyroborate, and 100 parts of triethylphosphine. On heating the resultant mixture to 160° C. for 15 hours, triethylphosphine borane is formed in good yield.

*Example V*

Using 125 parts of tetrahydrofuran as reaction solvent, 0.35 part of calcium borohydride, 18.3 parts of tri-(p-tert-butylphenyl)orthoborate and 4.8 parts of trimethylarsine are caused to react at 140° C. for 20 hours. Recovered from the reaction vessel is trimethylarsine borane.

*Example VI*

Into the reaction vessel of Example I are placed 100 parts of dimethyl carbitol, 19.44 parts of tri-(2,4,6-trimethylphenyl)methaborate, and 1.8 parts of dimethylamine. An adduct is formed between the metaborate and the amine. Next, 1.14 parts of sodium borohydride are added to the system and the resultant system heated to 220° C. for 4 hours. Hydrogen gas is evolved during the course of this reaction. The resultant product is N,N-dimethylborazene.

*Example VII*

Reacted together at 160° C. for 15 hours are 1.63 parts of magnesium borohydride and 36.36 parts of tetra-(p-nonylphenyl) pyroborate in admixture with 100 parts of didodecylamine. Formed in good yield is N,N-didodecylborazene.

*Example VIII*

In the reaction vessel of Example I are placed 100 parts of an equimolar mixture of n-octane and toluene (reaction solvent), 17.76 parts of trixylylmetaborate (mixed xylyl isomers), and 6.76 parts of diphenylamine. An adduct is formed between the metaborate and the amine. To this system is then added 0.66 part of lithium borohydride and the resultant system heated to 150° C. for 8 hours. The resultant product is N,N-diphenylborazene.

*Example IX*

Diethylphosphinoborane is formed by mixing together 2.51 parts of barium borohydride, 11.60 parts of triphenylorthoborate, and 100 parts of diethylphosphine, and heating this mixture under autogeneous pressure for 20 hours at 180° C.

*Example X*

Sodium borohydride (1.14 parts), triphenyl metaborate (14.4 parts), and dioctylarsine (12.1 parts) are heated together for 20 hours at 140° C. in 100 parts of heavy aromatic naphtha as reaction solvent. The product so-formed is dioctylarsine borane.

*Example XI*

N,N,N-tributylborazole is prepared in good yield by heating 9.32 parts of tetratolylpyroborate (mixed tolyl isomers) 100 parts of butylamine, and 1.62 parts of potassium borohydride in a closed reaction vessel under autogeneous pressure, the reaction temperature being 140° C. The reaction time is 4 hours.

*Example XII*

Placed in the reaction vessel of Example I are 100 parts of kerosene, 16.64 parts of tricumenyl orthoborate, and 5.68 parts of calcium allyl amine. Next, 3.5 parts of calcium borohydride are introduced into the vessel and the contents heated to 140° C. for 4 hours. Formed in good yield is N,N,N-triallylborazole.

It will be seen by reference to Examples III, VI, and VIII above that adducts are formed between the amines and the aryl metaborates. Generally speaking, these adducts are white crystalline solids which are insoluble in highly paraffinic solvents. On the other hand, they tend to remain in solution in highly aromatic solvents and the like. It will be seen, however, that the process of this invention is highly applicable to the formation of the present products using these metaborate-amine adducts as a starting material.

As brought out in a number of the above examples, the process of this invention can be advantageously conducted in the presence of various inert reaction solvents. Most suitable for this purpose are inert hydrocarbons and ethers. Exemplary of such hydrocarbon solvents are hexane, heptane, octane, decane, toluene, xylene, benzene, gasoline fractions, kerosene, naphtha, petroleum ethers, and, in general, hydrocarbons which are liquid at temperatures within the range of about 100° C. to about 250° C. Typical examples of the ether solvents include: tetrahydrofuran, dimethyl carbitol, dibutyl ether, diphenyl ether, trimethylol propane, diethyl ether, tetrahydropyran, and the like.

Conventional work-up procedures are readily adapted to the separation and recovery of the products of this invention from the reaction mixtures. Thus, such procedures as fractionation, decantation, centrifugation, solvent extraction, distillation at reduced pressure, etc. are advantageously used.

Methods are known to those skilled in the art and reported in the literature for preparation of the several components used in the practice of this invention. For example, the aryl orthoborates may be conveniently prepared by esterifying orthoboric acid with the appropriate phenolic compound. Temperatures of around 150° C. are quite satisfactory. The corresponding metaborates can be prepared by reacting the appropriate phenolic compound with orthoboric acid in proper molar ratio in the presence of a diluent which removes water azeotropically. Toluene, xylene, natural hydrocarbon fractions boiling in the range of 75° to 150° C., etc. are examples of such a diluent. The aryl pyroborates are prepared in a maner similar to that used in the preparation of the aryl metaborates. The chief differences are minor adjustments in the ratio of the phenolic compound and the orthoboric acid, and also the extent to which dehydration is effected. Examples of these borate esters include: tri - (p - ethylphenyl)orthoborate, tri - (p - octylphenyl)orthoborate, tri-($\beta$-naphthyl)orthoborate, tri-(p-phenylphenyl)orthoborate, tri-(penta-methylphenyl)metaborate, tri-(p-tert-butylphenyl)metaborate, tri-(o-phenylphenyl)metaborate, tetra-(phenyl)pyroborate, tetra-(2,5-xylyl)pyroborate, and the like.

A convenient method of preparing the light metal borohydrides involves the reaction of the metal hydride with methyl borate at temperatures between 180° to 300° C. The metal borohydride is usally isolated by extraction from the reaction mixture with an amine or an ether.

The borohydrides used in the practice of this invention are the borohydrides of lithium, sodium, potassium, rubidium, cesium, beryllium, magnesium, calcium, strontium, and barium.

Methods of preparing the amines, phosphines, and arsines are likewise reported in the literature. Many of the amines occur in and are readily recoverable from coal tar fractions, petroleum residues, and the like. Inasmuch as these amines, phosphines, and arsines are respectively derivatives of ammonia, phosphine and arsine, the art is well aware of procedures whereby these last-named materials can be converted into the corresponding hydrocarbyl compounds.

Exemplary of the hydrocarbyl amines, phosphines and arsines are benzyl amine, allyl amine, diethylamine, di-n-propyl amine, dibenzyl amine, triethyl amine, aniline, o-toluidine, beta-naphthyl amine, 2,6-diethyl aniline, N-ethyl aniline, N,N-dimethyl aniline, N,N-diethyl aniline, pyridine, 2-picoline, 3-picoline, 2,6-lutidine, quinoline, quinaldine, morpholine, piperidine, n-hexyl amine, 2-ethylhexyl amine, di-n-butyl amine, dodecyl amine, dilauryl amine, trieicosyl amine, phenylmethyl-propyl amine, 4-ethylcyclohexyl amine, triethyl phosphine, triisopropyl phosphine, tri-sec-amyl phosphine, tripentadecyl phosphine, triphenyl phosphine, tri-2,6-xylyl phosphine, tricumenyl phosphine, dimethyl phosphine, dicyclohexyl phosphine, diallyl phosphine, methylphenyl phosphine, alpha-naphthyl phosphine, n-hexyl phosphine, tridecyl phosphine, tripropylarsine, tri-(1,1,3,3-tetramethylbutyl)arsine, tri-m-tolyl arsine, diphenylmethyl arsine, diethyl arsine, diheptyl arsine, diundecyl arsine, phenyl arsine, methyl arsine, octyl arsine, p-nonylphenyl arsine, and the like.

The products formed by the process of this invention are of considerable value in the chemical and allied arts. For example, the hydrides of boron are effective cetane improvers when dissolved in low concentrations in diesel fuels. Concentrations ranging from about 0.01 to about 5 weight percent are sufficient for this purpose. For further details reference should be had to U.S. Patent No. 2,860,167, issued November 11, 1958. These hydrides of boron are likewise useful as additives to gasoline and other fuels for spark ignition internal combustion engines; and to engine and industrial oils. In these media small concentrations of these hydrides of boron exert antioxidant and sludge inhibiting properties. Other uses for such compounds include use as chemical reducing agents, use as agricultural chemicals, and the like.

What is claimed is:

1. A process for the preparation of hydrides of boron characterized by the step of reacting (1) a fully esterified aryl ester of an oxyacid of boron in which (*a*) the boron is bonded solely to oxygen atoms and (*b*) all of the esterifying groups are aryl groups containing up to and including about 18 carbon atoms with (2) an alkali metal borohydride, the reaction being conducted in admixture with a hydrocarbyl compound of a Group V–A element of atomic number 7 through 33, said compound being further characterized in that it contains three monovalent radicals directly affixed to the Group V–A element, in that each of said radicals is selected from the group consisting of hydrocarbyl radicals and hydrogen, and in that at least one of said radicals is a hydrocarbyl radical; said reaction being conducted at a temperature between about 100–250° C. with said ester being employed in amount between about 0.5 to 5 moles per mole of said borohydride and said hydrocarbyl compound being employed in amount of at least one mole thereof per mole of said ester.

2. The process of claim 1 further characterized in that said hydrocarbyl compound is an amine.

3. The process of claim 1 further characterized in that said borohydride is sodium borohydride.

4. A process for the preparation of trialkylamine boranes characterized by the step of reacting at a temperature in the range of about 180° to about 200° C. (1) a triaryl orthoborate in which each aryl group contains up to and including about 18 carbon atoms with (2) an alkali metal borohydride, the reaction being conducted in admixture with a trialkylamine in which each alkyl group contains from 1 to about 8 carbon atoms and said orthoborate is employed in amount between about 0.5 to 5 moles per mole of said borohydride and said trialkylamine is employed in amount of at least one mole thereof per mole of said orthoborate.

5. The process of claim 4 further characterized in that said orthoborate is triphenyl orthoborate, said borohydride is sodium borohydride, and said amine is triethylamine.

6. The process of claim 1 further characterized in that said hydrocarbyl compound is selected from the group consisting of prmary, secondary, and tertiary alkyl amines in which each alkyl group contains from 1 to about 8 carbon atoms.

References Cited in the file of this patent

UNITED STATES PATENTS

| | | |
|---|---|---|
| 2,860,167 | Brown | Nov. 11, 1958 |
| 2,970,894 | Chappelow et al. | Feb. 7, 1961 |

OTHER REFERENCES

Stone et al.: J. Am. Chem. Soc., vol. 76 (1954), pp. 386 to 389.

Burg et al. J.A.C.S., vol. 62, pages 3425–9 (1940).

Schechter et al.: "Boron Hydrides and Related Compounds," page 20 (1951).